(12) United States Patent
Butler et al.

(10) Patent No.: US 7,555,302 B2
(45) Date of Patent: Jun. 30, 2009

(54) DUAL EVENT SLOTTED PAGING

(75) Inventors: Brian K. Butler, La Jolla, CA (US); Klein S. Gilhousen, Bozeman, MT (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 11/678,557

(22) Filed: Feb. 23, 2007

(65) Prior Publication Data

US 2007/0149221 A1 Jun. 28, 2007

Related U.S. Application Data

(63) Continuation of application No. 10/981,359, filed on Nov. 3, 2004, which is a continuation of application No. 10/062,209, filed on Jan. 31, 2002, now Pat. No. 6,832,094, which is a continuation of application No. 08/890,355, filed on Jul. 9, 1997, now Pat. No. 6,393,295, which is a continuation-in-part of application No. 08/865,650, filed on May 30, 1997, now Pat. No. 6,111,865.

(51) Int. Cl.
*H04W 68/02* (2006.01)
(52) U.S. Cl. .................. 455/458; 455/466; 370/335; 340/7.43
(58) Field of Classification Search ............. 455/458, 455/450, 515, 517, 561, 466, 343.4; 370/465, 370/335, 342; 340/7.43, 7.44, 7.32
See application file for complete search history.

(56) References Cited

U.S. PATENT DOCUMENTS

| | | |
|---|---|---|
| 4,585,463 A | 4/1986 | Hirose |
| 4,845,491 A | 7/1989 | Fascenda et al. |
| 5,103,459 A | 4/1992 | Gilhousen et al. |
| 5,239,306 A | 8/1993 | Siwiak et al. |
| 5,301,225 A | 4/1994 | Suzuki et al. |

(Continued)

FOREIGN PATENT DOCUMENTS

CA 2139516 1/1994

(Continued)

OTHER PUBLICATIONS

International Search Report, PCTUS98/010912, International Search Authority EPO, Dec. 18, 1998.

(Continued)

*Primary Examiner*—Philip J Sobutka
(74) *Attorney, Agent, or Firm*—S. Hossain Beladi; Larry J. Moskowitz

(57) ABSTRACT

A novel and improved method and system for paging a cellular telephone or other wireless terminal using two paging channels that reduces standby mode power consumption described. In one embodiment of the invention, a minimally encoded quick paging channel is established over which short, quick page messages are transmitted during one of a set of quick paging slots. The quick page message indicates that a communications request has been received, and that the receiving communication terminals should process a highly encoded full paging channel over which more detailed, full page messages are transmitted during the next full paging slot. A terminal monitors full paging channel only after a quick page message has been received on the quick paging channel.

33 Claims, 6 Drawing Sheets

U.S. PATENT DOCUMENTS

| | | |
|---|---|---|
| 5,311,516 A | 5/1994 | Kuznicki et al. |
| 5,377,183 A | 12/1994 | Dent |
| 5,382,949 A | 1/1995 | Mock et al. |
| 5,392,287 A | 2/1995 | Tiedemann et al. |
| 5,392,452 A | 2/1995 | Davis |
| 5,398,021 A | 3/1995 | Moore |
| 5,404,355 A | 4/1995 | Raith |
| 5,450,071 A | 9/1995 | DeLuca et al. |
| 5,481,254 A | 1/1996 | Gaskill et al. |
| 5,485,463 A * | 1/1996 | Godoroja ............... 340/7.44 X |
| 5,491,718 A | 2/1996 | Gould et al. |
| 5,509,015 A | 4/1996 | Tiedemann et al. |
| 5,511,067 A * | 4/1996 | Miller ................... 455/561 X |
| 5,511,110 A | 4/1996 | Drucker |
| 5,537,097 A | 7/1996 | Eriksson et al. |
| 5,543,781 A | 8/1996 | Ganucheau, Jr. et al. |
| 5,544,223 A | 8/1996 | Robbins et al. |
| 5,568,483 A | 10/1996 | Padovani et al. |
| 5,629,940 A | 5/1997 | Gaskill |
| 5,659,573 A | 8/1997 | Bruckert et al. |
| 5,697,097 A | 12/1997 | Reibel et al. |
| 5,710,762 A | 1/1998 | Petranovich |
| 5,710,784 A | 1/1998 | Kindred et al. |
| 5,712,869 A | 1/1998 | Lee et al. |
| 5,809,419 A | 9/1998 | Schellinger et al. |
| 5,826,173 A | 10/1998 | Dent |
| 6,111,865 A | 8/2000 | Butler |
| 6,173,007 B1 | 1/2001 | Odenwalder et al. |
| 6,832,094 B2 | 12/2004 | Butler |

FOREIGN PATENT DOCUMENTS

| | | |
|---|---|---|
| CN | 1133513 | 10/1996 |
| CN | 1138813 | 12/1996 |
| EP | 0 514 360 A2 | 11/1992 |
| EP | 0 629 095 A2 | 12/1994 |
| EP | 0681406 | 5/1995 |
| EP | 0 796 025 A2 | 9/1997 |
| EP | 1471761 | 10/2004 |
| GB | 2201866 | 9/1988 |
| GB | 2244409 | 11/1991 |
| WO | 8806830 | 9/1988 |
| WO | 9010987 | 9/1990 |
| WO | 9306685 | 4/1993 |
| WO | 9318596 | 9/1993 |
| WO | 9405126 | 3/1994 |
| WO | 9409599 | 4/1994 |
| WO | 9400923 | 6/1994 |
| WO | 9507594 | 3/1995 |
| WO | 9512955 | 3/1995 |
| WO | 9608941 | 3/1996 |
| WO | 9610895 | 4/1996 |

OTHER PUBLICATIONS

European Search Report 07002633.1, International Search Authority, Munich May 14, 2007.

* cited by examiner ary, the benefits provided by IS-95 include longer talk time, higher capacity, and fewer dropped calls when compared to other types of cellular telephone systems.

DUAL EVENT SLOTTED PAGING

CLAIM OF PRIORITY UNDER 35 U.S.C. §120

The present application for Patent is a Continuation and claims priority to U.S. patent application Ser. No. 10/981,359 entitled "Dual Event Slotted Paging" filed Nov. 3, 2004, which is a Continuation of U.S. patent application Ser. No. 10/062,209 entitled "Dual Event Slotted Paging" filed Jan. 31, 2002, now U.S. Pat. No. 6,832,094, which is a continuation of U.S. patent application Ser. No. 08/890,355 entitled "Dual Channel Slotted Paging" filed Jul. 9, 1997, now U.S. Pat. No. 6,393,295, which is a Continuation-in-Part of U.S. patent application Ser. No. 08/865,650 entitled "Dual Channel Slotted Paging" filed May 30, 1997, now U.S. Pat. No. 6,111,865, all of which are assigned to the assignee of the present application hereof and hereby expressly incorporated by reference herein.

BACKGROUND OF THE INVENTION

I. Field of the Invention

The present invention relates to wireless telecommunications. More particularly, the present invention relates to a novel and improved method and apparatus for paging a cellular telephone or other wireless communications device.

II. Description of the Related Art

The IS-95 cellular telephone standard (and its derivatives such as IS-95A and ANSI J-STD-008 referred to herein collectively as IS-95) uses advanced signal processing techniques to provide efficient and high quality cellular telephone service. For example, an IS-95 compliant cellular telephone system utilizes vocoding, error detection, forward error correction (FEC), interleaving and spread spectrum modulation in order to make more efficient use of the available RF bandwidth, and to provide more robust connections. In general, the benefits provided by IS-95 include longer talk time, higher capacity, and fewer dropped calls when compared to other types of cellular telephone systems.

To conduct communications in an orderly manner, IS-95 provides a set of highly encoded channels over which data having different functions is transmitted. These highly encoded channels include a paging channel over which paging messages are transmitted notifying cellular telephones or other types of wireless terminals that an incoming request to communicate is pending. In accordance with the IS-95 standard, paging messages are transmitted at low to medium data rates (4800 or 9600 bps) during time slots that are preassigned to groups of cellular telephones. Table I provides the data included in a General Page Message as an example of typical a paging message generated substantially in accordance with the IS-95A standard.

TABLE I

| Message Field | Length (Bits) |
| --- | --- |
| MSG_TYPE (Message Type) | 8 |
| CONFIG_MSG_SEQ | 6 |
| ACC_MSG_SEQ | 6 |
| CLASS_0_DONE | 1 |
| CLASS_1_DONE | 1 |
| RESERVED | 2 |
| BROADCAST_DONE | 1 |
| RESERVED | 4 |
| ADD_LENGTH | 3 |
| ADD_PFIELD | 8 × ADD_LENGTH |

TABLE I-continued

| Message Field | Length (Bits) |
| --- | --- |
| And zero or more occurrences of the following page record: | |
| PAGE_CLASS | 2 |
| PAGE_SUBCLASS | 2 |
| Page class specific fields | Typically 2-12 bytes. |

Table I is provided simply to illustrate the length of a typical paging message, so a detailed description of the function of each field is not included herein. Such a detailed description may obtained, however, by referring to the well known, and publicly available, IS-95 standard (in particular the IS-95A standard). The paging messages also begin with an eight bit message length field (MSG_LEN), that indicates the length of the message, and end with a 30 bit cyclical-redundancy-check (CRC) field (not shown).

To monitor for paging messages, a cellular telephone periodically monitors the paging channel during the assigned paging slot. In particular, the cellular telephone periodically activates complex RF and digital signal processing circuitry for as long as is necessary to successfully process the paging message. Since the typical paging message is relatively long, and transmitted via a highly encoded low to medium rate channel, the associated processing during each paging slot requires a significant amount time and signal processing resources, and therefore requires a significant amount of power to complete. This reduces the amount of time an IS-95 cellular telephone can remain in standby mode using a battery of given capacity, and therefore is highly undesirable.

SUMMARY OF THE INVENTION

The present invention is a novel and improved method and system for paging a cellular telephone or other wireless terminal that reduces standby mode power consumption. In accordance with one embodiment of the invention, a minimally encoded quick paging channel is established over which short, quick page messages are transmitted during one of a set of quick paging slots. The quick page message indicates that a request to communicate has been received and that the receiving communication terminals should process a highly encoded full paging channel transmitted during the next full paging slot for a more detailed, full page message. A communications terminal monitors full paging channel after a quick page message has been received on the quick paging channel.

To page the communications terminal, a base station controller first generates the quick page message during a quick page slot assigned to a set of communications terminal that includes the particular communications terminals being paged. This is followed by a full page message identifying the particular communications terminal. The communications terminal periodically monitors the quick paging slot and, upon detecting the quick page, activates decoding circuitry for processing the full paging channel. Upon processing the full paging channel, the communications terminal determines if the full page message is directed to it, and if not, deactivates the decoding circuitry and returns to processing the quick paging channel.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF THE PREFERRED EMBODIMENTS

A method and system for paging a cellular telephone or other wireless terminal that reduces standby mode power consumption is described. In the following description the invention is set forth in the context of a cellular telephone system operating substantially in accordance with the IS-95 standard. While the invention is particularly suited for operation in such an environment, many other digital communication systems can benefit from the use of the present invention, including TDMA based wireless communication systems, satellite based communication system, and wireline systems over which encoded signaling is transmitted.

Figure 1:
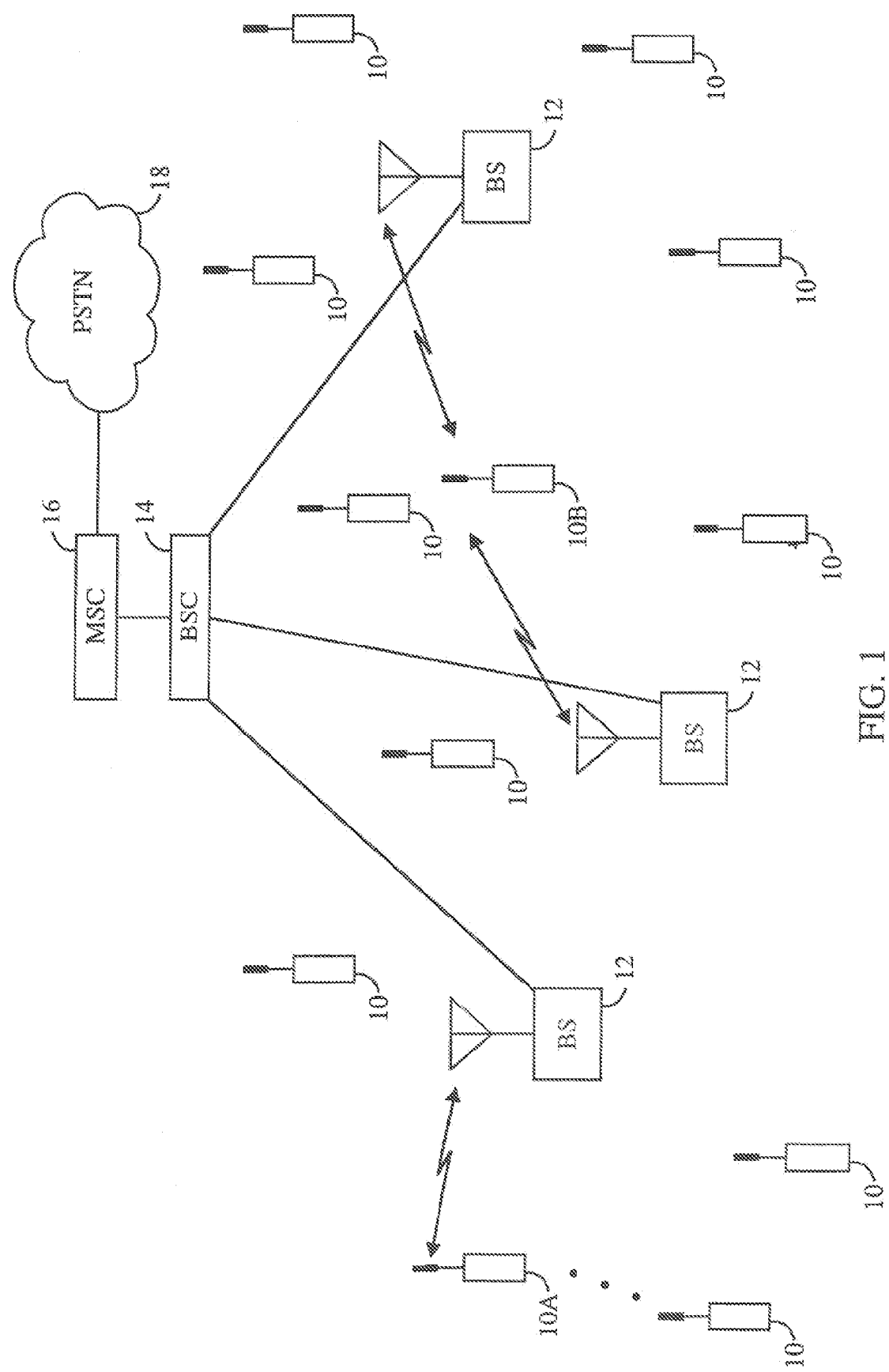
FIG. 1 is a block diagram of a cellular telephone system.

FIG. 1 is a block diagram of a highly simplified cellular telephone system configured in accordance with the use of the present invention. Wireless terminals 10 (typically cellular telephones) are located among base stations 12. Wireless terminals 10a and 10b are in active mode and therefore are interfacing with one or more base stations 12 using radio frequency (RF) signals modulated in accordance with the CDMA signal processing techniques of the IS-95 standard. A system and method for processing RF signals substantially in accordance with the use of the IS-95 standard is described in U.S. Pat. No. 5,103,459 entitled "System and Method for Generating Signal Waveforms in a CDMA Cellular Telephone System" assigned to the assignee of the present invention and incorporated herein by reference ('459 patent). The other wireless terminals 10 are in standby mode and therefore monitoring for page messages indicating a request to communicate.

In the preferred embodiment of the invention, each base station generates a forward link signals comprised of a set of forward link channels. The channels are established by a set of orthogonal 64 chip (or bit) Walsh codes, each of which is used to modulate the data associated with a particular channel. The channels are categorized by function and include a pilot channel over which a phase offset pattern is repeatedly transmitted, a synch channel over which synchronization data is transmitted including the absolute system time and the phase offset of the associated pilot channel, and traffic channels over which the data directed to the terminals are transmitted. The traffic channels are normally assigned to transmit data to a particular wireless terminal 10 for the duration of the interface with that particular base station.

Additionally, in accordance with one embodiment of the invention, one or more or the Walsh channels are designated as quick paging channels, and one or more or the Walsh channels as full paging channels. The designation and operation of the full paging channels is preferably performed in accordance with the paging channel specified by the IS-95 standard. Some methods and apparatus for performing paging substantially in accordance with the IS-95 standard are described in U.S. Pat. Nos. 5,392,287 ('287 patent) entitled "APPARATUS AND METHOD FOR REDUCING POWER CONSUMPTION IN A MOBILE COMMUNICATIONS RECEIVER" AND U.S. Pat. No. 5,509,015 ('015 patent) entitled "METHOD AND APPARATUS FOR SCHEDULING COMMUNICATIONS BETWEEN TRANSCEIVERS" both assigned to the assignee and incorporated herein by reference.

As described in the '287 and '015 patents, and as specified by the IS-95 standard, the full paging channel is time divided into time "slots". The slots are, in turn, assigned to groups of wireless terminals, where the assignment is performed based on the International Mobile Subscriber ID (IMSI) which is unique for each wireless terminal 10, or other terminal identification information such as one or more Mobile Identification Numbers (MIN). In alternative embodiments of the invention other identification information may also be used including the electronic serial number (ESN) of the wireless terminal or the temporary mobile subscriber ID (TMSI). Others will recognize additional values that may be used. The various possible types of identification information that may be used will be referred to hereinafter collectively as the MOBILE ID. The quick paging channels are also divided into time slots.

Figure 2:
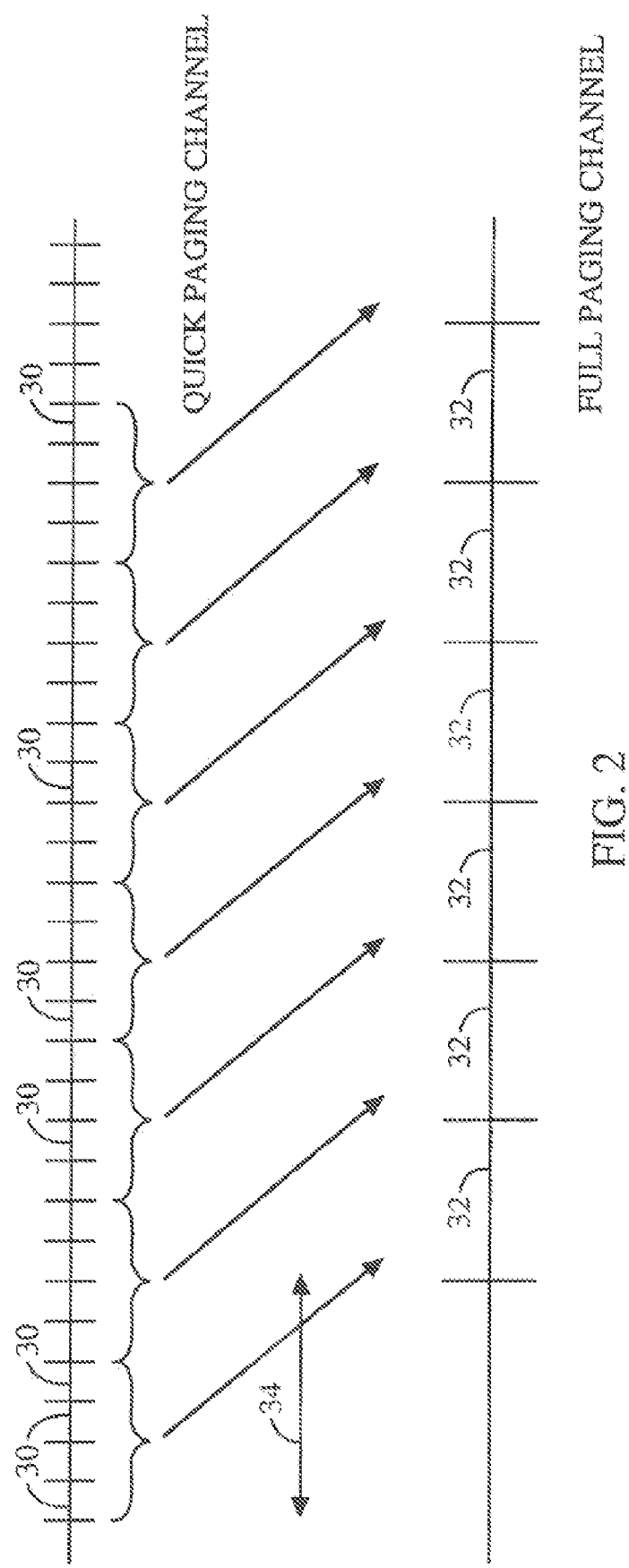
FIG. 2 is a timing diagram illustrating the timing slots in the quick paging channel and the full paging channel.

FIG. 2 is a timing diagram illustrating the time slots of a full paging channel and a quick paging channel when configured in accordance with one embodiment of the invention. The quick paging channel is divided into quick paging slots 30 and the full paging channel is divided into full paging slots 32 which are preferably longer in duration that the quick paging slots. Sets, or groups, of quick paging slots 30 are assigned to single full paging slots 32 as illustrated by the diagonal arrows, although the use of a one-to-one correspondence between quick paging slots and full paging slots, or other ratios, is consistent with the use of the invention. The assignment of the quick paging slots 30 to a particular set of wireless terminals is preferably performed via application of a hashing function to the MOBILE ID of the wireless terminal 10.

To page a particular wireless terminal 10, a quick page message is transmitted during the quick paging slot and a full page message is transmitted during the full page slot assigned to that wireless terminal. The quick paging slot and full paging slots occur in a periodically repeating fashion, which ensures that a slot associated with a particular terminal occurs after some limited period of time. As illustrated in FIG. 2, the full page slots 32 occur a delay 34 after the associated quick paging slots 30 to allow the wireless terminal to process the quick page message and activate additional decoding circuitry before the next full page slot.

Figure 3:
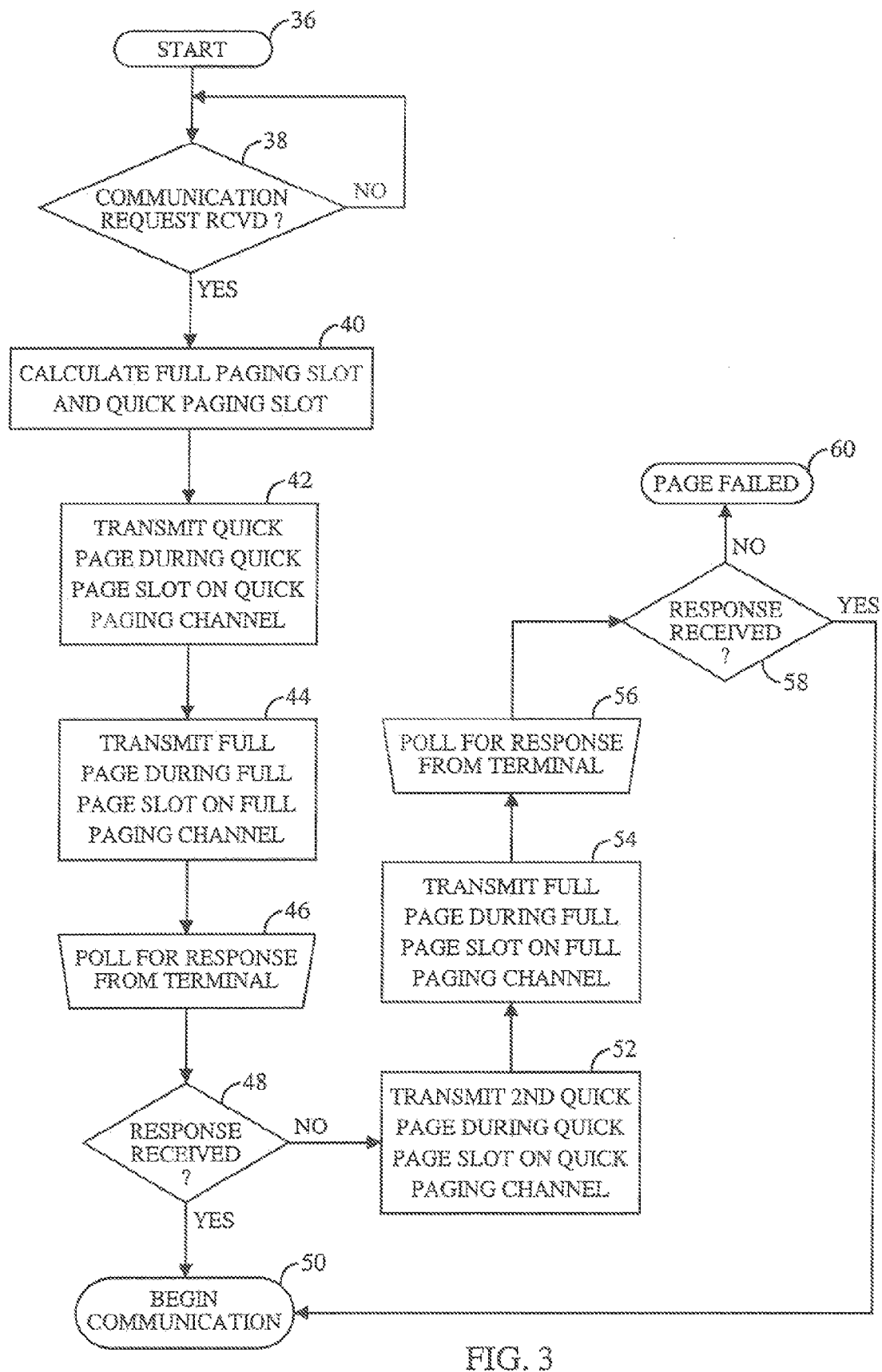
FIG. 3 is a flow diagram illustrating the steps performed during the paging of a wireless terminal.

FIG. 3 is a block diagram of the steps performed by BSC 14 during the paging process. The paging process begins at step 36 and at step 38 it is determined whether a request to communicate has been received. If not step 38 is performed again.

If a request to communicate has been received, the full paging slot and quick paging slot associated with the wireless terminal to which the communication request is directed are calculated at step 40 based on the MOBILE ID or other identification information of that wireless terminal 10. In one embodiment of the invention, the quick paging slot is calculated using a first hashing function, and the full paging slot is calculated using a second hashing function where the second hashing function is different than the first hashing function. Additionally, the full paging slots are on the order of 80 ms, while the quick paging slots are on the order of 5 ms. The wireless terminal 10 may have to process all or part of the full paging channel depending on the content of the paging message being received in accordance with IS-95. BSC 14 preferably performs the necessary processing using one or more microprocessors running software stored in memory (not shown).

In an exemplary embodiment of the invention, the full paging slot is determined in accordance with the above referenced '287 and '015 patents, and the quick paging slot is determined by application of another hashing function to the MOBILE ID, although the use of other methods for assigning paging slots to wireless terminals is consistent with the use of the present invention. In particular, the full page slot corresponds to the system time t, provided in frames of 20 ms, where the following equation is true:

$$(\text{floor}(t/4) - \text{PGSLOT}) \mod (16*T) = 0, \quad (1)$$

where T is a slot cycle length in units of 1.28 second given by $T=2^i$ where i is the slot cycle index (SCI). PGSLOT is determined using a the following hashing function:

$$\text{PGSLOT} = \text{floor}(N \times ((40505 \times (L \sim H \sim \text{DECORR})) \mod 2^{\wedge}16)/2^{\wedge}16), \quad (2)$$

where L is the 16 least significant bits of a 32-bit HASH_KEY and H is 16 most significant bits of the HASH_KEY, and N is 2048. The HASH_KEY is preferably the MOBILE_ID or some derivative thereof such and the IMSI. The function floor(x) returns the largest integer less than or equal to x. For example, the result of floor(2.99), floor(2.01) and floor(2.00) is 2 and the result of floor (−2.5) is −3. The decorrelation value DECORR is calculated as follows:

$$\text{DECORR} = 6 \times \text{HASH\_KEY}[0.11] \quad (3)$$

where HASH_KEY[0.11] is the eleven least significant bits of the 32 bit HASH_KEY value.

The hashing function used to determine the quick paging slot in a preferred embodiment of the invention is calculated in a similar manner to the full paging slot, except that the quick paging slot occurs between 40 to 120 ms before the full paging slot, and the set of wireless terminals assigned to a quick paging slot changes over time to ensure that each wireless terminal 10 is associated with a different set of other wireless terminals 10 during each quick paging slot. Varying the set of terminals 10 with which each wireless terminal 10 is associated during each paging slot helps ensure that less active wireless terminals do not become permanently associated with a more active wireless terminal 10, and therefore have to unnecessarily monitor for a large number full paging messages that are not directed to it.

In an exemplary embodiment of the invention, the quick paging slot for a wireless terminal 10 occurs within an 80 ms quick page period that begins 120 ms before the beginning of the full paging slot as calculated by the following equation:

$$(\text{floor}((t-6)/4) - \text{PGSLOT}) \mod (16*T) = 0, \quad (4)$$

where PGSLOT is the same as that used for the full paging slot. The duration of the quick page period is preferably 80 ms. The quick page period is divided into quick paging slots during which the quick page messages are transmitted, which is described in greater detail below. Preferably, the quick paging slots and associated quick page messages are a single bit in duration. Therefore, the number of quick paging slots per quick page period is a function of the data rate of the quick paging channel.

As should be apparent, equation (4) is the same as equation (1) except that system time is offset by six frames, which causes the beginning of the quick page period to begin 120 ms before the full page slot. Providing an offset of 120 ms ensures that there is at least 40 ms of time exists (given the quick page period of 80 ms) between any particular quick page slot and the full page slot, which gives the wireless terminal enough time to prepare to process the full page message after receiving a quick page message.

Within the 80 ms quick page period, the quick paging slot (having a duration of one bit) assigned to a particular wireless terminal 10 is determined using the following equation:

$$\text{QUICK\_PGSLOT} = 1 + \text{floor}(N \times ((40505 \times (L \sim H \sim \text{DECORR})) \mod 2^{\wedge}16)/2^{\wedge}16), \quad (5)$$

with the value N is set to the quick paging channel data rate (QPAGE_RATE) in number of bits per 80 ms slot. For example, if the quick paging channel data rate is 9600 bits/second the value QPAGE_RATE is equal to 768 bits/frame. Additionally, the decorrelation value is set as follows:

$$\text{DECORR} = \text{floor}((t-6)/64) \mod 2^{\wedge}16. \quad (6)$$

Thus, equation (5) returns a value between 1 and 768 corresponding to the quick paging slot (or bit location) within an 80 ms quick page period that begins 120 ms before the corresponding full paging slot. The wireless terminal monitors the quick paging channel during this quick paging slot and if a quick page message is received, the wireless terminal will then monitor the full paging channel for a full paging message.

As should be apparent from equation (6), the decorelation value DECORR for the quick paging channel is calculated as a function of system time, and therefore the resulting value QUICK_PGSLOT for a given set of wireless terminals 10 will differ as time progresses. This causes the set of wireless terminals 10 associated with a particular full paging slot to have different quick paging slots over time (although they may still be paged during the same quick page period), which will help ensure that a less active wireless terminal 10 is not tied to a more active wireless terminal 10 which would cause it to monitor the full paging channel with unnecessary frequency, and therefore unnecessary energy consumption.

Once the quick paging slot and the full paging slot are determined, BSC 14 transmits a quick page message at step 42 on a quick paging channel, and full page message at step 44 on a full paging channel, via one or more base stations 12. The base stations 12 encode and modulate the paging channels as described in greater detail below, and transmission of the two page messages occurs during the corresponding quick paging slot and full paging slot.

After transmission of the quick page message and the full page message, the BSC 14 polls for a response at step 46 indicating that the page was received. If a response was received the communication begins at step 50.

If no response was received after a time-out period, a second quick page message is transmitted at step 52, and a second full page message is transmitted at step 54. At step 56 the BSC 14 polls for a response from the wireless terminal 10 and determines at step 58 if a response was received. If a response was received, the communication begins at step 50. If it is determined at step 58 that no response was received, the page fails at step 60. In an alternative embodiment of the invention, two or more quick paging messages and two or more corresponding full page messages are generated for each page. The second quick page message and full page message increase the likelihood of the page being received, without introducing the delay necessary to determine whether an acknowledgment message has been received from the wireless terminal 10.

In the preferred embodiment of the invention, the quick page message is comprised of an INCOMMING_PAGE bit.

An INCOMING_PAGE bit in a first state (such as logic high) indicates that a communication request has been receive for one of the wireless terminals 10 associated with that quick paging slot, and therefore that those wireless terminals should process the full paging channel during the next designated full paging slot. An INCOMING_PAGE bit in a second state (such as logic low) indicates that no communication request has been received for those wireless terminals 10, and therefore the full paging channel should not be processed during next assigned full paging slot. Hence, the quick page message is more highly encoded than the full page message, since the page is represented by a single bit, rather than a substantially higher number of bits, and therefore can be processed with fewer resources. Such "message" encoding should not be confused with the "channel" coding described below, where a greater amount of encoding requires more data processing resources, and therefore is less desirable in term of power consumption.

In the preferred embodiment of the invention, the full page message contains the information specified in the IS-95 standard for a normal page message that allows each wireless terminal 10 to determine whether the page is directed to it. An example of a page generated in accordance with the IS-95A standard in provided in Table I listed above. As illustrated by Table I, the full page message contains significantly more information than the quick page message, which is preferably comprised of a single bit. Therefore, the quick page message can be processed more easily by each wireless terminal 10, and with less power, than a full page message.

In alternative embodiments of the invention, multi-bit quick page messages are used. These multi-bit quick paging messages are used to encode and convey additional information beyond simply indicating that the wireless terminal 10 should monitor the full paging channel during the next assigned full paging slot 32. For example, the multi-bit quick page message could be used to indicate more particularly which wireless terminal 10 is being paged from the subset of wireless terminal assigned to the corresponding quick page slot 30. The multi-bit quick page message could also be used to indicate that the full paging channel should be monitored for a longer duration so that system parameter changes can be broadcast to all the wireless terminals 10. Those skilled in the art will recognize various useful types of information that can be transmitted using a multi-bit quick page message. Also, in another alternative embodiment of the invention, reduced forward error correction encoding is performed on the quick page message.

Figure 4:
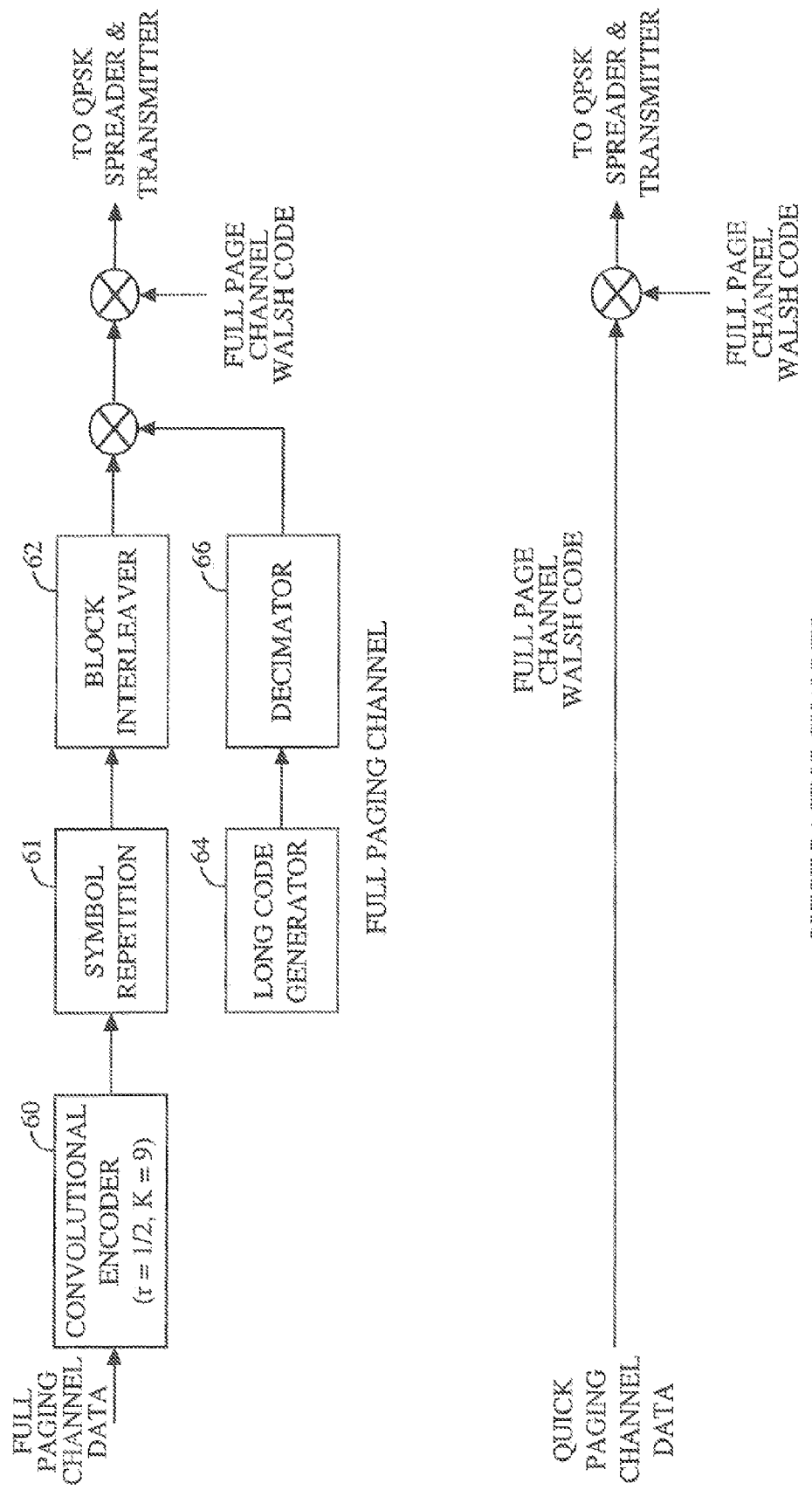
FIG. 4 is a block diagram illustrating the coding performed on the full paging channel and the quick paging channel.

In addition to transmitting less information in a quick page message than in a full page message, the preferred embodiment of the invention incorporates a minimal coding scheme for the quick paging channel when compared to the full paging channel. FIG. 4 provides an illustration of the coding schemes employed for the full paging channel and the quick paging channel in accordance with one embodiment of the invention.

As shown in FIG. 4, data transmitted via the full paging channel is convolutionally encoded by convolutional encoder 60 and the resulting code symbols repeated by symbol repeater 61 in order to generate symbols at a predetermined rate. The repeated code symbols are then block interleaved by block interleaver 62. The data from block interleaver is scrambled via EXCLUSIVE-OR (XOR) with a decimated long code generated by long code generator 64 and decimator 66. The long code is binary code generated in predetermined manner as a function of a seed number, and is known to all wireless terminals 10. The scrambled data is the modulated with a Walsh channel code designated for a full paging channel, and the Walsh channel code modulated data is QPSK spread using a pseudorandom noise code (PN code), summed with the data from the other channels, and upconverted for transmission, preferably in accordance with the IS-95 standard (spreading, summing and upconversion not shown.)

Still referring to FIG. 4, data transmitted via the quick paging channel is applied directly to a Walsh channel code designated for a quick paging channel, and then spread, summed and upconverted as described above. Preferably, a single bit of data transmitted via the quick channel is modulated multiple times by the same Walsh code, effectively transmitting the bit multiple times. One could also transmit the data bit repeatedly using a symbol repeater like symbol repeater 61 used for the full paging channel. In still another embodiment of the invention, the quick paging channel could be scrambled using the long code as performed for the full paging channel.

As should be apparent from FIG. 4, the processing associated with transmitting information over the quick paging channel is substantially less in both duration and complexity than that associated with the full paging channel. Therefore, the amount of processing necessary to perform receive processing of the quick paging channel is also substantially less, and therefore requires less energy than that necessary for the full paging channel. While the reduced amount of processing performed for the quick paging channel does increase the likelihood of error during the processing of any particular bit, other methods for reducing the effect of this increased error rate, without substantially increasing complexity, can be employed. The methods include transmitting the same bit multiple times or interpreting low quality transmissions as positive page messages as described below.

Figure 5:
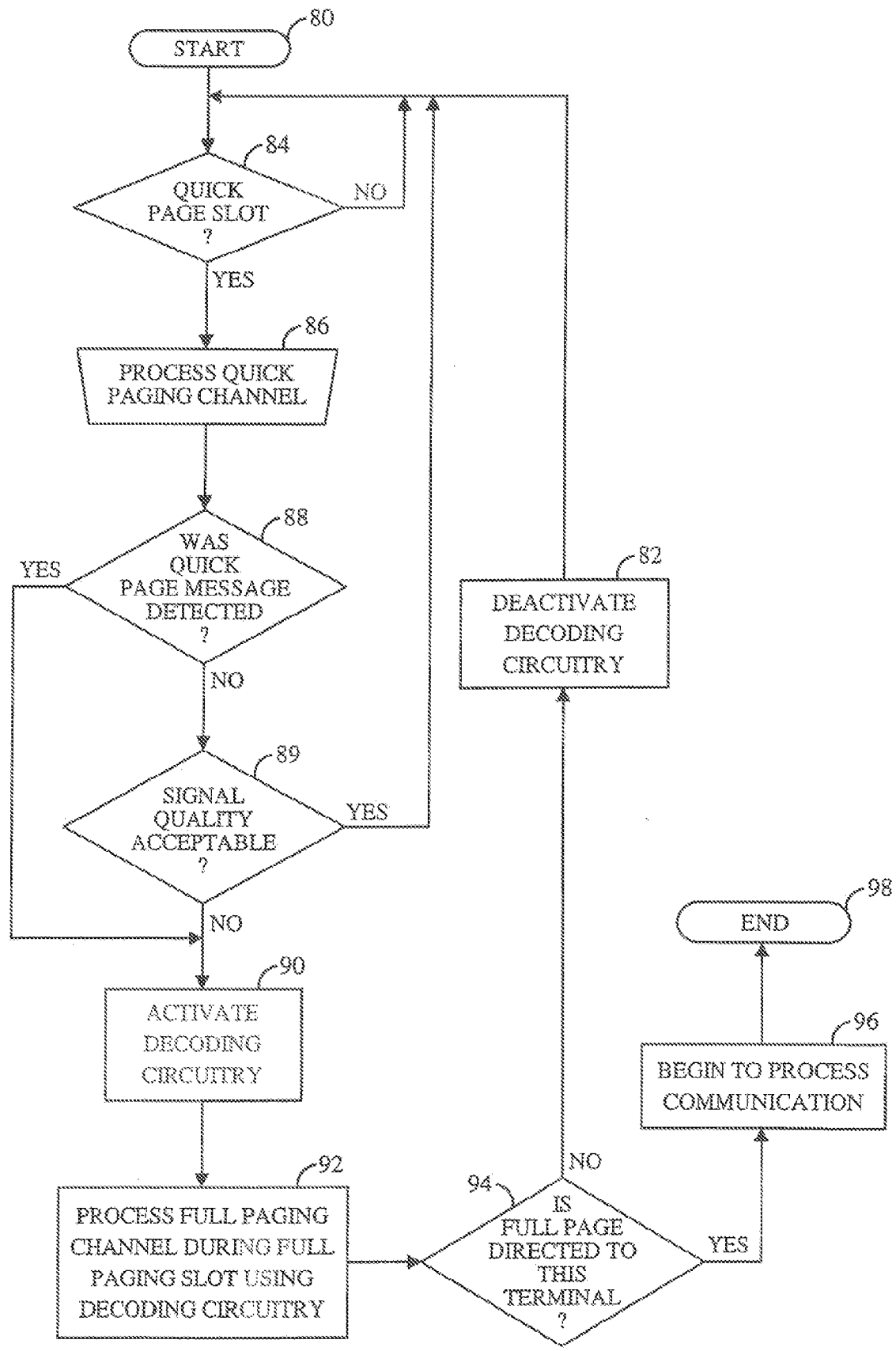
FIG. 5 is a flow diagram illustrating the steps performed by a wireless terminal during standby mode.

FIG. 5 is a flow diagram of the processing performed by a wireless terminal 10 in standby mode when performed in accordance with one embodiment of the invention. The processing is preferably performed using a microprocessor controller by software instructions stored in memory coupled to other integrated circuits and systems that are well known in the art (not shown). The processing begins at step 80 and at step 84 it is determined whether the assigned quick paging slot has arrived, and if not step 82 is performed again.

If the assigned quick paging slot has arrived, the wireless terminal 10 processes the quick paging channel at step 86. Preferably, the processing is performed using a significantly smaller subset of the signal processing circuitry contained in the wireless terminal than used to process full page messages. In accordance with the transmit processing performed for the quick paging channel shown in FIG. 4, the receive processing is preferably comprised of downconversion of the RF energy received, despreading with the PN spreading code, and demodulation with the designated Walsh code. The resulting soft decision data is processed directly to determine the logic level transmitted.

Referring again to FIG. 5, at step 88 it is determined whether a quick page message was received at step 86 based on the logic level of the data detected. If a quick page message was detected processing continues at step 90 as described below. If a quick page message was not detected, it is further determined at step 89 whether the signal quality during the processing of the quick paging channel was acceptable. If so, the wireless terminal 10 returns to step 82. If the signal quality was not acceptable, processing continues at step 90 as described below.

The received signal quality can be determined by various well known methods including determining when the receive power of the signal from transmitted from transmitter 50 falls below a threshold, or by determining when the signal-tonoise ratio of the pilot channel falls below a predetermined threshold. By monitoring for a full page message when the received signal quality is unacceptable, the number of missed full page messages due to undetected quick page messages resulting from unacceptable signal quality is minimized.

If a quick page message was detected, or the received signal quality was not acceptable, the wireless terminal 10 activates additional decoding circuitry at step 90 and, at step 92 processes the full paging channel during the assigned full paging slot using the activated circuitry. The time between the quick paging slot and the full paging slot assigned to a particular terminal must be sufficient to allow activation of the additional decoding circuitry within the wireless terminal 10 after detection of the quick page message before the full page slot occurs.

At step 94, the wireless terminal 10 determines whether the full page message processed at step 92 was directed to it based on the address contained in that message, and if not decoding circuitry within wireless terminal 10 is deactivated at step 82 and step 84 is performed again. If the full page message was directed to the wireless terminal 10, processing for the corresponding communication begins within the wireless terminal at step 96, and the wireless terminal enters active mode at step 98.

Figure 6:
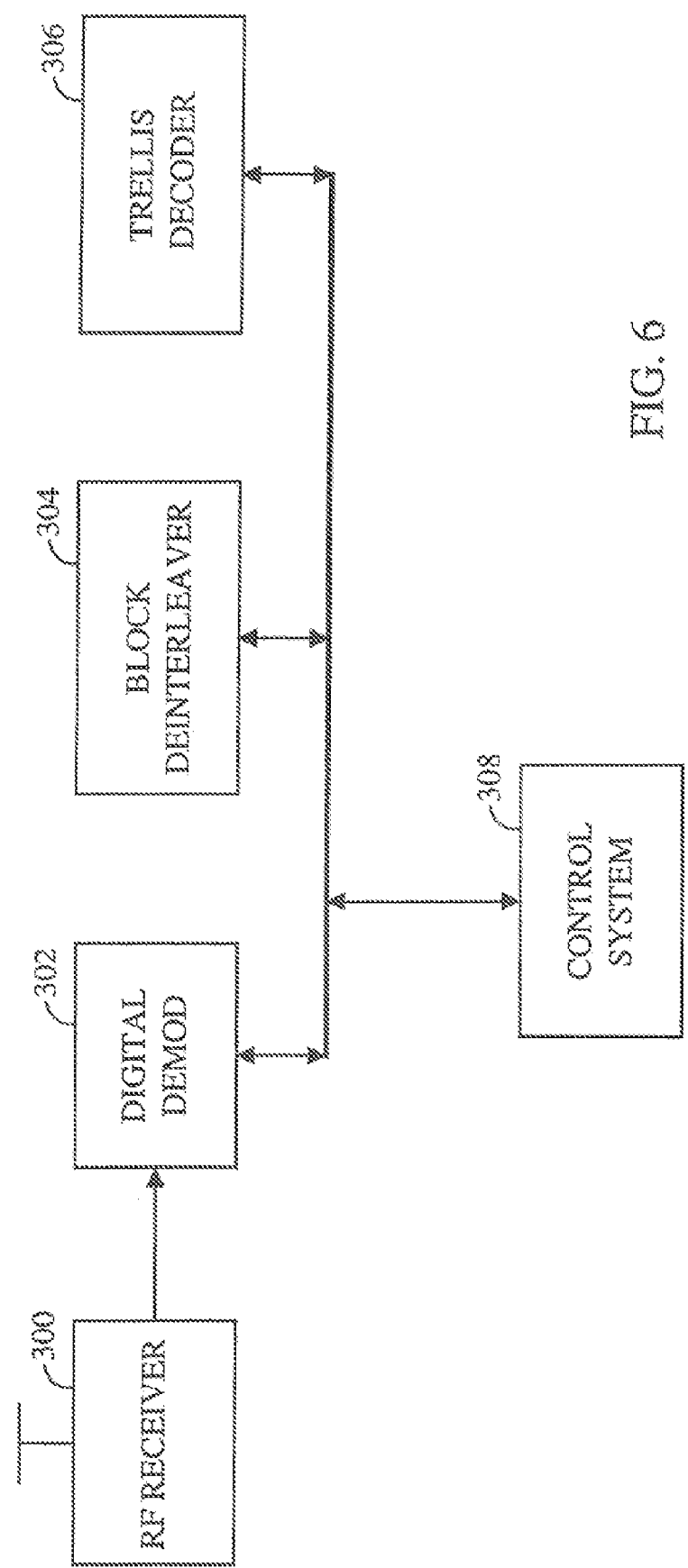
FIG. 6 is a block diagram of a receiver configured in accordance with one embodiment of the invention.

FIG. 6 is a block diagram providing a highly simplified illustration of wireless terminal 10 when configured in accordance with one embodiment of the invention. Digital demodulator 302, block interleaver 304, trellis decoder 306 and control system 308 are coupled via a digital bus, and RF receiver 300 is coupled to digital demodulator 302.

During standby mode, control system periodically activates RF receiver 300 and digital demodulator 302 to process the pilot and quick paging channels. RF receiver 300 downconverts and digitizes RF signals and digital demodulator 302 performs digital demodulation for a first duration generating soft decision data for the channels being processed. Control system 308 examines the pilot channel soft decision data to determine the quality of the signal and examines the quick paging channel to determine if a quick page message has been received.

If a quick page message has been received, or the signal has been received with poor quality, control system 308 activates block deinterleaver 304 and trellis decoder 306 and configured digital demodulator to begin processing the full paging channel for a second duration that is longer than the first duration. Control system 308 then monitors the data received over the full paging channel for a full paging message directed to it, and if none is detected, deactivates block deinterleaver 304 and trellis decoder 306 and continues in standby mode. If a full page message is detected, control system 308 places wireless terminal in active mode during which the associated communication is conducted.

In still another embodiment of the invention, the quick paging channel and the full paging channel are combined on to the same code channel. That is, the quick paging channel and the full paging channel are modulated with the same Walsh code. Within the same code channel the quick paging channel and the full paging channel are logically distinguished by a predetermined time division scheme. For example, during some 80 ms slots quick paging messages are transmitted, while during other 80 ms slots full paging channel messages are transmitted in accordance with a predetermined slot allocation scheme. This implementation simplifies the receive and transmit processing somewhat by only requiring modulation and demodulation of a single code channel, but would require more significant modification to the existing IS-95 standard and therefore provides less compatibility with existing IS-95 compliant wireless communication systems.

As should be apparent from the description provided above, by paging using a quick page message with a minimal number of bits, and which is transmitted over a minimally encoded channel, the present invention allows a wireless terminal to consume less power when monitoring for page messages during standby mode. Consuming less power in standby mode allows a wireless terminal to operate longer on a given battery, and therefore extends the standby time of that wireless terminal. Since wireless terminals are typically used in mobile telecommunications, it is often necessary to go extended periods of time without recharging or replacing the battery of the wireless terminal. Thus, in order to provide increased convenience, and to reduce the likelihood of missing page messages due to battery depletion, extending the standby time for a given battery size is highly desirable.

Additionally, since quick page messages are transmitted within a highly reduced period of time, monitoring for quick page message can be performed during active mode when a phone call or other communication is being processed in addition to standby mode. Such monitoring can be performed by briefly suspending processing of the traffic channel to allow processing of the quick paging channel during the quick paging slot. Since the quick paging slot is on the order of 5 ms, any lost data will typically not be missed or detected, and can often be recovered using the forward error correction (FEC) encoding. Once the quick page message is received, the full paging message may be received by further suspending processing of the traffic channel by transmission of a signaling message to the base station controller, followed by processing of the full paging channel. Thus, the ability to receive paging message during active mode is enhanced by the use of the dual event paging scheme described herein.

Thus, a dual channel method and system for paging cellular telephones and other wireless terminals that reduces standby power consumption has been described. The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

We claim:

1. A method for paging a wireless terminal in a wireless telecommunications system comprising:

transmitting a quick page message via a first encoded channel, said quick page message notifying the wireless terminal to begin monitoring a second encoded channel for a full page message, wherein said first encoded channel is less encoded than said second encoded channel;

transmitting a full page message via said second encoded channel;

wherein said second encoded channel includes more processing than said first encoded channel, wherein said more processing includes encoding through an encoder, interleaving through an interleaver, and adding cyclic redundancy check through a cyclic redundancy check circuit to said full page message;

wherein said wireless terminal is a particular wireless terminal included within a set of wireless terminals in said wireless communication system; wherein said quick page message is for directing said set of wireless terminals to monitor said second encoded channel for said full page message; wherein said quick page message contains less data bits than said full page message; wherein said full page message identifies said particular wireless terminal among said set of wireless terminals;

wherein said transmitting said quick page message is during a first time slot assigned to the set of wireless terminals;

wherein said transmitting said full page message is during a second time slot assigned to the set of wireless terminals; wherein said second time slot is assigned to said first time slot by way of having a determined time delay between said first and second time slots; wherein said second time slot occurs after said first time slot; wherein said quick page message is comprised of a single bit of data, wherein said single bit of data transmitted via said first encoded channel is modulated multiple times by the same code, effectively transmitting the bit multiple times in said transmitting said quick page message, and wherein the set of wireless terminals assigned to said first paging slot changes over time to ensure that each wireless terminal is associated with a different set of other wireless terminals during each first paging slot, wherein different sets of wireless terminals are assigned to different first paging slots, and wherein a group of said first paging slots are assigned to a single second paging slot, said group of said first paging slots forming a quick page period beginning a fixed time before the beginning of the second paging slot.

2. The method as set forth in claim 1, wherein said second encoded channel is established via direct sequence modulation with a second channel code.

3. The method as set forth in claim 1 further comprising the steps of:
generating a quick page message before said step of transmitting said quick page message via said first encoded channel; and
generating a full page message before transmitting said full page message via said second encoded channel.

4. The method as set forth in claim 1 further comprising the steps of:
direct sequence spreading said full page message; and
direct sequence spreading said quick page message.

5. The method as set forth in claim 1 further comprising the steps of:
receiving said quick page message during said first time slot;
activating signal processing circuitry;
receiving said full page message during said second time slot and using said activated signal processing circuitry to process said full message.

6. The method as set forth in claim 5 wherein said signal processing circuitry is comprised of a trellis decoding system.

7. The method as set forth in claim 5 wherein said signal processing circuitry is comprised of a deinterleaver.

8. The method as set forth in claim 5 wherein said signal processing circuitry is comprised of a cyclical redundancy check circuit.

9. The method as set forth in claim 1, wherein said encoder is a convolutional encoder.

10. A method for paging a wireless terminal in a wireless telecommunications system comprising:
receiving a quick page message via a first encoded channel, said quick page message notifying the wireless terminal to begin monitoring a second encoded channel for a full page message, wherein said first encoded channel is less encoded than said second encoded channel;

receiving a full page message via said second encoded channel;

wherein said receiving said full page message includes more processing than said receiving said quick page message, wherein said more processing includes decoding through a decoding system, deinterleaving through a deinterleaver, and processing through a cyclical redundancy check circuit;

wherein said wireless terminal is a particular wireless terminal included within a set of wireless terminals in said wireless communication system; wherein said quick page message is for directing said set of wireless terminals to monitor said second encoded channel for said full page message; wherein said quick page message contains less data bits than said full page message; wherein said full page message identifies said particular wireless terminal among said set of wireless terminals;

wherein said receiving said quick page message is during a first time slot assigned to the set of wireless terminals;

wherein said receiving said full page message is during a second time slot assigned to the set of wireless terminals; wherein said second time slot is assigned to said first time slot by way of having a determined time delay between said first and second time slots; wherein said second time slot occurs after said first time slot;

wherein said quick page message is comprised of a single bit of data, said single bit of data transmitted via said first encoded channel is modulated multiple times by the same code, effectively receiving the bit multiple times in said receiving said quick page message, and wherein the set of wireless terminals assigned to said first paging slot changes over time to ensure that each wireless terminal is associated with a different set of other wireless terminals during each first paging slot wherein different sets of wireless terminals are assigned to different first paging slots, and wherein a group of said first paging slots are assigned to a single second paging slot, said group of said first paging slots forming a quick page period beginning a fixed time before the beginning of the second paging slot.

11. The method as set forth in claim 10, wherein said decoding system is a trellis decoding system.

12. An apparatus, comprising:
means for receiving a quick page message via a first encoded channel, said quick page message notifying the wireless terminal to begin monitoring a second encoded channel for a full page message, wherein said first encoded channel is less encoded than said second encoded channel;

means for receiving a full page message via said second encoded channel;

wherein said means for receiving said full page message includes more processing means than said means for receiving said quick page message, wherein said more processing means includes means for decoding through a decoding system, means for deinterleaving through a deinterleaver, and means for processing through a cyclical redundancy check circuit;

wherein said wireless terminal is a particular wireless terminal included within a set of wireless terminals in said wireless communication system; wherein said quick page message is for directing said set of wireless terminals to monitor said highly encoded channel for said full page message; wherein said quick page message contains less data bits than said full page message; wherein said quick page message lacks any information for identifying any wireless terminal among said set of wireless terminals;

wherein said full page message identifies said particular wireless terminal among said set of wireless terminals;

wherein said receiving said quick page message is during a first time slot assigned to the set of wireless terminals;

wherein said receiving said full page message is during a second time slot assigned to the set of wireless terminals; wherein said second time slot is assigned to said first time slot by way of having a determined time delay between said first and second time slots; wherein said second time slot occurs after said first time slot;

wherein said quick page message is comprised of a single bit of data, wherein said single bit of data transmitted via said first encoded channel is modulated multiple times by the same code, effectively receiving the bit multiple times in said receiving said quick page message, and wherein the set of wireless terminals assigned to said first paging slot changes over time to ensure that each wireless terminal is associated with a different set of other wireless terminals during each first paging slot wherein different sets of wireless terminals are assigned to different first paging slots, and wherein a group of said first paging slots are assigned to a single second paging slot, said group of said first paging slots forming a quick page period beginning a fixed time before the beginning of the second paging slot.

13. The method as set forth in claim 12, wherein said decoding system is a trellis decoding system.

14. An apparatus for paging a wireless terminal in a wireless telecommunications system comprising:

means for transmitting a quick page message via a first encoded channel, said quick page message notifying the wireless terminal to begin monitoring a second encoded channel for a full page message, wherein said first encoded channel is less encoded than said second encoded channel;

means for transmitting a full page message via said second encoded channel;

wherein said second encoded channel includes more processing than said first encoded channel, wherein said more processing includes encoding through an encoder, interleaving through an interleaver, and adding cyclic redundancy check through a cyclic redundancy check circuit to said full page message;

wherein said wireless terminal is a particular wireless terminal included within a set of wireless terminals in said wireless communication system; wherein said quick page message is for directing said sct of wireless terminals to monitor said second encoded channel for said full page message; wherein said quick page message contains less data bits than said full page message; wherein said full page message identifies said particular wireless terminal among said set of wireless terminals;

wherein said transmitting said quick page message is during a first time slot assigned to the set of wireless terminals;

wherein said transmitting said full page message is during a second time slot assigned to the set of wireless terminals; wherein said second time slot is assigned to said first time slot by way of having a determined time delay between said first and second time slots; wherein said second time slot occurs after said first time slot; wherein said quick page message is comprised of a single bit of data, wherein said single bit of data transmitted via said first encoded channel is modulated multiple times by the same code, effectively transmitting the bit multiple times in said transmitting said quick page message, wherein the set of wireless terminals assigned to said first paging slot changes over time to ensure that each wireless terminal is associated with a different set of oilier wireless terminals during each first paging slot, wherein different sets of wireless terminals are assigned to different first paging slots, and wherein a group of said first paging slots are assigned to a single second paging slot, said group of said first paging slots forming a quick page period beginning a fixed time before the beginning of the second paging slot.

15. The apparatus as set forth in claim 14, wherein said second encoded channel is established via direct sequence modulation with a second channel code.

16. The apparatus as set forth in claim 14, further comprising:

means for generating a quick page message before transmitting said quick page message via said first encoded channel; and means for generating a full page message before transmitting said full page message via said second encoded channel.

17. The apparatus as set forth in claim 14, further comprising:

means for direct sequence spreading said full page message; and means for direct sequence spreading said quick page message.

18. The apparatus as set forth in claim 14, further comprising:

means for receiving said quick page message during said first time slot;

means for activating signal processing circuitry; and means for receiving said full page message during said second time slot and using said activated signal processing circuitry to process said full message.

19. The apparatus as set forth in claim 18, wherein said signal processing circuitry is comprised of a trellis decoding system.

20. The apparatus as set forth in claim 18, wherein said signal processing circuitry is comprised of a deinterleaver.

21. The apparatus as set forth in claim 18, wherein said signal processing circuitry is comprised of a cyclical redundancy check circuit.

22. The apparatus as set forth in claim 18, wherein said encoder is a convolutional encoder.

23. An apparatus, comprising:

at least one processor configured to transmitting a quick page message via a first encoded channel, said quick page message notifying the wireless terminal to begin monitoring a second encoded channel for a full page message, wherein said first encoded channel is less encoded than said second encoded channel, and transmitting a quick page message via a less first encoded channel, said quick page message notifying the wireless terminal to begin monitoring a second encoded channel for a full page message, wherein said first encoded channel is less encoded than said second encoded channel, and transmit a full page message via said second encoded channel; and a memory coupled to the at least one processor, wherein said second encoded channel includes more processing than said first encoded channel, wherein said more processing includes encoding through an encoder, interleaving through an interleaver, and adding cyclic redundancy check through a cyclic redundancy check circuit to said full page message;

wherein said wireless terminal is a particular wireless terminal included within a set of wireless terminals in said wireless communication system; wherein said quick page message is for directing said set of wireless terminals to monitor said second encoded channel for said full page message; wherein said quick page message contains less data bits than said full page message; wherein said full page message identifies said particular wireless terminal among said set of wireless terminals;

wherein said transmitting said quick page message is during a first time slot assigned to the set of wireless terminals;

wherein said transmitting said full page message is during a second time slot assigned to the set of wireless terminals; wherein said second time slot is assigned to said first time slot by way of having a determined time delay between said first and second time slots; wherein said second time slot occurs after said first time slot; wherein said quick page message is comprised of a single bit of data, wherein said single bit of data transmitted via said first encoded channel is modulated multiple times by the same code, effectively transmitting the bit multiple times in said transmitting said quick page message, and wherein the set of wireless terminals assigned to said first paging slot changes over time to ensure that each wireless terminal is associated with a different set of other wireless terminals during each first paging slot, wherein different sets of wireless terminals are assigned to different first paging slots, and wherein a group of said first paging slots are assigned to a single second paging slot, said group of said first paging slots forming a quick page period beginning a fixed time before the beginning of the second paging slot.

24. The apparatus as set forth in claim 23, wherein said second encoded channel is established via direct sequence modulation with a second channel code.

25. The apparatus as set forth in claim 23, wherein the at least one processor is further configured to:
generate a quick page message before transmitting said quick page message via said first encoded channel; and
generate a full page message before transmitting said full page message via said second encoded channel.

26. The apparatus as set forth in claim 23, wherein the at least one processor is further configured to
direct sequence spread said full page message, and
direct sequence spread said quick page message.

27. The apparatus as set forth in claim 23, wherein the at least one processor is further configured to
receive said quick page message during said first time slot,
activate signal processing circuitry, and
receive said full page message during said second time slot and use said activated signal processing circuitry to process said full message.

28. The apparatus as set forth in claim 27, wherein said signal processing circuitry is comprised of a trellis decoding system.

29. The apparatus as set forth in claim 27, wherein said signal processing circuitry is comprised of a deinterleaver.

30. The apparatus as set forth in claim 27, wherein said signal processing circuitry is comprised of a cyclical redundancy check circuit.

31. The apparatus as set forth in claim 23, wherein said encoder is a convolutional encoder.

32. An apparatus, comprising: at least one processor configured to
receive a quick page message via a less first encoded channel, said quick page message notifying the wireless terminal to begin monitoring a highly second encoded channel for a full page message, wherein said first encoded channel is less encoded than said second encoded channel, and
receive a full page message via said second encoded channel; and
a memory coupled to the at least one processor,
wherein said receiving said full page message includes more processing than said receiving said quick page message, wherein said more processing includes decoding through a decoding system, deinterleaving through a deinterleaver, and processing through a cyclical redundancy check circuit;
wherein said wireless terminal is a particular wireless terminal included within a set of wireless terminals in said wireless communication system; wherein said quick page message is for directing said set of wireless terminals to monitor said second encoded channel for said full page message; wherein said quick page message contains less data bits than said full page message; wherein said full page message identifies said particular wireless terminal among said set of wireless terminals;
wherein said receiving said quick page message is during a first time slot assigned to the set of wireless terminals;
wherein said receiving said full page message is during a second time slot assigned to the set of wireless terminals; wherein said second time slot is assigned to said first time slot by way of having a determined time delay between said first and second time slots; wherein said second time slot occurs after said first time slot;
wherein said quick page message is comprised of a single bit of data, said single bit of data transmitted via said first encoded channel is modulated multiple times by the same Walsh code, effectively receiving the bit multiple times in said receiving said quick page message,
and wherein the set of wireless terminals assigned to said first paging slot changes over time to ensure that each wireless terminal is associated with a different set of other wireless terminals during each first paging slot,
wherein different sets of wireless terminals are assigned to different first paging slots, and
wherein a group of said first paging slots are assigned to a single second paging slot, said group of said first paging slots forming a quick page period beginning a fixed time before the beginning of the second paging slot.

33. The apparatus as set forth in claim 32, wherein said decoding system is a trellis decoding system.

* * * * *